United States Patent Office 2,712,944
Patented July 12, 1955

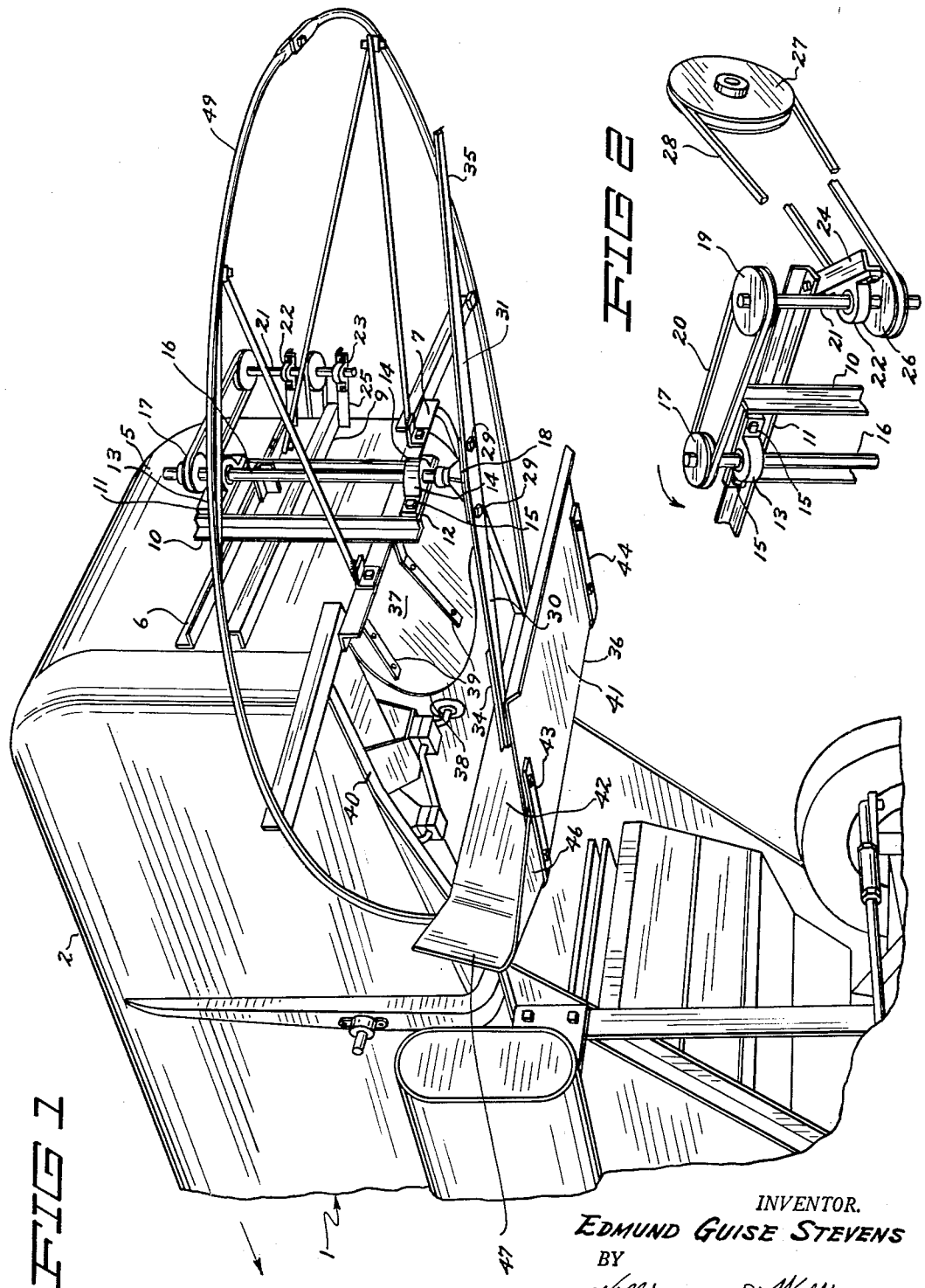

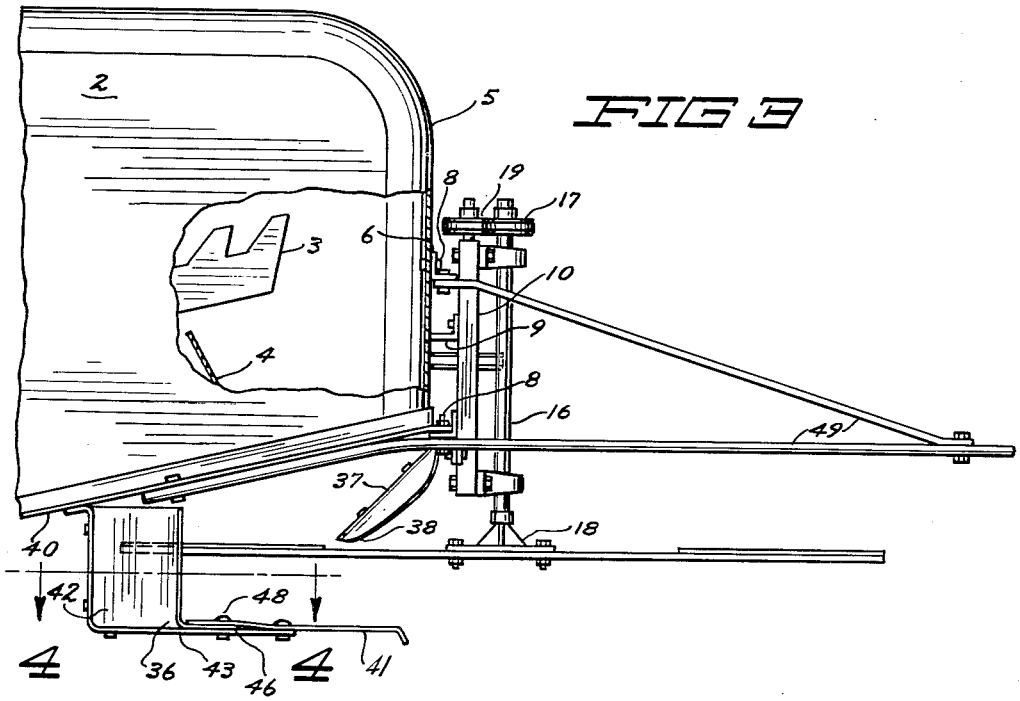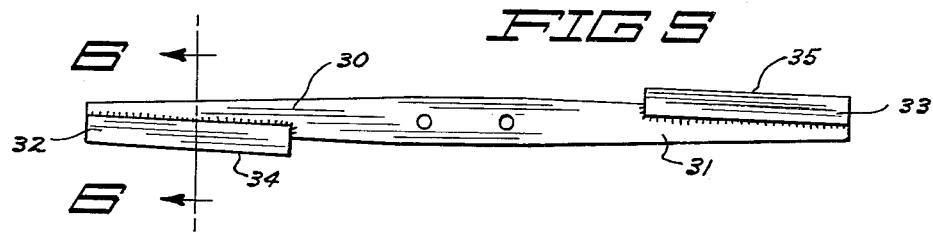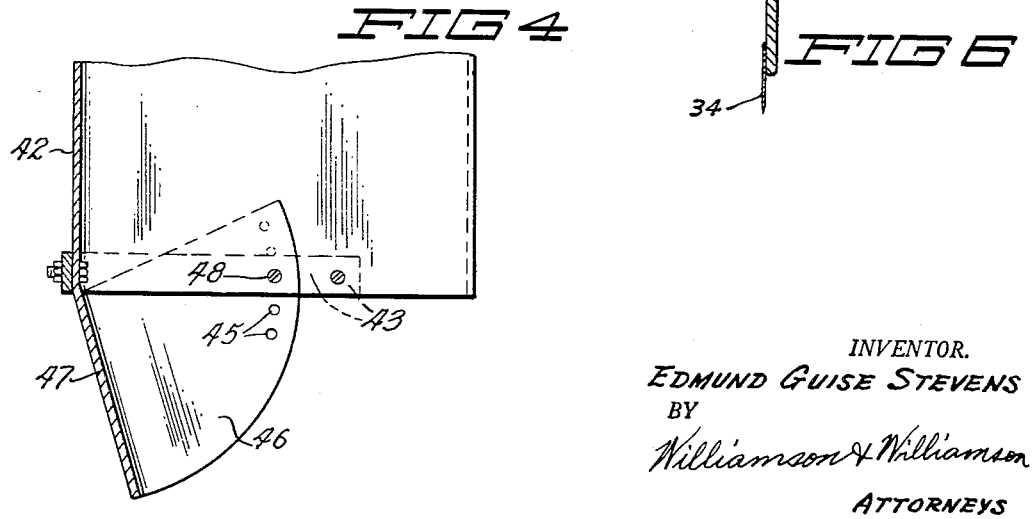

2,712,944

STRAW CUTTER AND DISTRIBUTOR

Edmund Guise Stevens, Winnipeg, Manitoba, Canada

Application August 11, 1951, Serial No. 241,439

4 Claims. (Cl. 275—3)

This invention relates to combines and other equipment adapted to harvest grain and food crops. It has special reference to moving equipment which will disintegrate and distribute the discarded waste portions including straw and stalks of the harvested plant life onto the terrain for fertilization, mulching or other soil conditioning.

It is a principal object of the invention to provide a relatively inexpensive improved cutting and comminuting apparatus which may be attached to ordinary harvester equipment or may be furnished therewith as standard equipment.

Another object of the invention is to provide an extremely simple and efficient device for disintegrating plant stalks and straw by cutting and comminuting, and substantially simultaneously therewith distributing the disintegrated product in a controlled manner for application to the surface of the soil.

A further object of the invention is to provide a device for cutting and comminuting straw and plant stalks which will be operable under extreme conditions of moisture, matting and toughness which have heretofore necessitated laborious adjustment or complete suspension of the operation of similar devices, and will be operable to handle foreign substances such as stones and wood particles with a minimum of breakage or damage to the device.

A further object of the invention is to provide for a device for the cutting and comminuting of straw and plant stalks which employs moving cutting blades exclusively which blades perform their function through centrifugal force and impact against the inertia of the material rather than through shearing action.

Another object of the invention is to obtain a wide and uniform distribution of the disintegrated plant waste product upon the soil and terrain over which the harvesting equipment is moving by means of the same blade elements which perform the disintegration.

A further object of the invention is to provide for simple adjustments to accommodate widely varying conditions encountered in the disintegration and distribution of waste harvest products.

A still further object of the invention is to provide for a device and mechanism of the class described having thin cutting blades which have the characteristic and capability of being self-sharpening during their useful lives.

These and other objects and advantages of the invention will become more fully apparent from the following description which is made with reference to the accompanying drawings in which like reference characters refer to similar parts in each of the several views.

In the drawings, Fig. 1 is a perspective view of my disintegrating and distributing device.

Fig. 2 is an undetailed representation of the driving mechanism for the device.

Fig. 3 is a side elevation with a portion of the harvester hood cut away to show internal structure.

Fig. 4 is a cross sectional segment of the cooperating distributor element showing details of the deflecting vane from the direction of the arrows 4—4 in Fig. 3 but at a different angular position and on an enlarged scale.

Fig. 5 is a separate plan view of the cutter arms with cutting blades attached thereto.

Fig. 6 is an enlarged cross section of an arm and cutting blade viewed from Fig. 5 at line 6—6.

The numeral 1 refers generally to a harvester such as a combine having the usual ability to cut and thresh grain and mechanism for moving the waste straw and stalk products to a rearward point for discharge back to the ground. The discharge passageway is located in the rear housing element 2 which has one or more walls 5 for defining a generally descending discharge passage. Fig. 3 shows a portion of the straw conveyor 3 which brings the straw and stalks from the combine to the discharge passageway for downward air circulation and gravity flow. A straw deflector sheet 4 is usually associated with the discharge passageway in order to prevent accumulation or balling of straw within the internal areas of the combine.

My invention includes a mounting structure which supports the device at the rear of the combine. Lateral braces 6 and 7 are mounted by means of bolts 8 upon the vertical rear hood wall 5 to form a reinforcement for the hood and a base portion for the mounting structure. One or more additional braces 9 may be employed for increasing the strength of the structure. Also, included in the mounting structure is a rectangular frame work constructed of two vertical side bars 10 with a cross bar 11 welded or otherwise secured across the upper ends of the bars 10 and a cross bar 12 secured across the lower ends of the bars 10. Upper bearing 13 is attached to cross bar 11 and is aligned with lower bearing 14 which is attached to cross bar 12. The bearings are securely attached by such means as bolts 15 and may be of any suitable type, preferably roller or ball thrust bearings.

Journaled within the bearings is a freely rotatable shaft 16 which may be keyed or pressed into the ball or roller bearings for stability against relative vertical movement. At or near the upper extremity of the shaft 16 is a sheave 17 and at or near the lower extremity is a face plate 18.

Referring to Fig. 2, the sheave 17 is driven by sheave 19 through V-belt 20. The sheave 19 is mounted on countershaft 21 which in turn is journaled for free rotation in countershaft bearings 22 and 23. The bearing 22 is attached to a brace 24 which in turn is fastened to lateral brace 6 while bearing 23 is attached to brace 25 which in turn is fastened to lateral brace 9. A more rigid construction of countershaft bearing assembly may be required than that shown in the abbreviated representation of the drawings but the construction thereof will be readily apparent to any ordinary mechanic. At the lower end of countershaft 21 is mounted sheave 26 which is driven in turn by sheave 27 through the belt 28. Drive sheave 27 may be mounted upon any suitable power source associated with the combine or harvester such as an independent prime mover or a take-off from the combine mechanism itself which power source is not shown in the drawings. The V-belt 28 may be given a quarter twist as shown in Fig. 2 for a drive sheave 27 rotating in the direction indicated or may be given a quarter twist in the opposite direction for a counterrotating sheave 27. In either event, the shaft 16 will continue to rotate in counterclockwise direction as viewed from above in order to effect discharge of straw and stalk cuttings to an area predominantly to the rear and the left of the combine as viewed from behind. It is understood, of course, that should it be desired to distribute the cuttings predominantly to the rear and the right of the combine the rotating elements and cooperating structures hereinafter described must be reversed.

Referring now to Figs. 1 and 3 the hub or face plate 18 which is attached to and rotatable with shaft 16 has mounted thereon by bolts 29 or other suitable securing means cutter arms 30 and 31 arranged in a balanced radial fashion. The cutter arms 30 and 31 may be of unitary structure as shown and are not limited to any specific number although it has been found that for ordinary purposes from two to four dynamically balanced arms are useful. The arms 30 and 31 are constructed of flat bar material with the plane surfaces thereof substantially transverse to the axis of shaft 16. In the preferred embodiment shown herein, the cutter arms have no pitch whatsoever. A very slight downward pitch may be employed in some instances, however, to aid in a downward suction of straw and stalk material while descending in the discharge passageway. In no event must the blades be pitched for upward draft since such construction would tend to defeat the downward flow of straw and stalks into the path of the cutter arms.

Secured to or formed from the outer ends of arms 30 and 31 are cutting blades 32 and 33 which are formed of thin metal strips which may range in thickness from $20/1000$ to $50/1000$ of an inch in thickness with an optimum thickness of $35/1000$ of an inch and having generally the quality and hardness of tempered steel. The cutting blades 32 and 33 have thinly tapered cutting edges 34 and 35 respectively which edges may be straight as shown or curved within the same plane. It has been found that a thin cutting blade of the described thickness and quality and operating at peripheral speeds hereinafter described has the surprising characteristic of being self-sharpening when used on ordinary small grain combining. It is not clearly understood whether the blade edge is actually ground and tapered during the cutting operation or whether there is a microscopic chipping action which results in self-sharpening. The phenomenon, however, has been observed and makes possible the practical and economical continued employment of the same cutting blades throughout their useful lives without necessitating frequent removal and sharpening. It is thought that most of the straw and stalk particles are not cut by the sharpest portion of the blade edge but that the straw particle is first sharply bent at the point of impact with the hard outer surface thereof in pinching relation with the blade edge. The bent straw or stalk will then become severed or will travel by centrifugal action outwardly on the continuous blade edge. This centrifugal travel may be only a short distance but may be sufficient to subject the blade edge to a longitudinal sharpening action by the hard-shelled pinching straw particle. The more flexible straw or stalk particles such as those which are not fully ripe, may actually be cut by the sharp bladed edge. Since the dry and hard shelled particles predominate, the net result is to maintain the thin blade in a sharp condition. A dull or unsharpened blade within the range mentioned will actually become sharp whereas a sharp blade of a greater thickness will not exhibit self-sharpening. It is obvious, of course, that if the blade is too thin it will chip and wear at an uneconomical rate. The cutting edges 34 and 35 form at least a portion of the leading edges of each of cutter arms 30 and 31 and because of their thinness lie for all practical purposes in the same plane as the surfaces of the cutter arms to which they are attached. The radial sweep of the cutting edges 34 and 35 covers substantially the entire area defined by the opening of the discharge passage of the combine or harvester.

Secured to the lateral brace 7 is the baffle sheet 37 which may be employed to assist in controlling and directing the downward movement of the straw and stalks into the path of the cutter blades and away from the inner portions of the cutter arms where straw and stalks are apt to become lodged and entwined upon shaft 16 if not so prevented. The baffle sheet 37 may be curved at its outer edge 38 to conform generally to an arc concentric with the path of rotation of the cutter arms 30 and 31. Bracing rods 39 may be attached to the under surface of sheet 37 for reinforcing the sheet and maintaining the upper surface of the sheet relatively free from protuberances. The baffle sheet 37 in addition to its curved edge 38 may have a compound surface curvature ranging from a flat surface at the straight line where the sheet is attached to lateral brace 7 to a convex upper face near the edge 38 thereof. This curvature assists in guiding the straw to the effective area swept by the cutting edges 34 and 35 and maintains the moving straw and stalks away from the region of the axis of the arm blades during operation of the device. The baffle sheet 37 may be merely bent upwardly or downwardly at the line where it is secured to brace 7 to accomplish a variety of feed conditions. The effective range of angular setting lies from 25 degrees to 80 degrees with the horizontal plane defined by the rotating blades. Under ordinary conditions the customary angle is 45 degrees. If the straw discharge is heavier than usual or the moisture content of the straw and plant stalks is high with consequent sluggish movement of the material fed to the discharge opening the angle of the baffle sheet 37 may be set by bending to an increased angular position so as to offer less resistance to its passage and to utilize the greater portion of the length of the cutting edges. On the other hand, it is advantageous where the straw is thin, dry and fast-moving to retard its forward discharge movement and to deliver the straw to a smaller and faster moving portion of the length of the cutting edges by decreasing its angular position.

Attached across the frame 40 which defines the discharge opening in the combine hood 2 and at a position opposed to that of the mounting structure and forward of the orbital path of the cutter arms is a cooperating distributor element 36. The distributor element comprises a retarder pan 41 which is parallel to the plane of rotation of cutter arms 30 and 31 and underlies the orbital path thereof by several inches, and a distributor flange 42 lateral to and joining with the retarder pan 41 which flange is positioned for close clearance with the tips of the cutter arms in their rotation. L-shaped supporting bars 43 and 44 are bolted or otherwise secured to the frame 40 and are in turn secured to the distributor flange portion 42 and the retarder pan portion 41 of the cooperating distributor element. A deflecting vane 47 is formed as an extension of the flange 42 and has a laterally bent plate portion 46 in which several holes 45 may be aligned with bolt 48 which extends through the bar 43 and through the retarder pan 41. The deflecting vane 47 may be adjusted so as to form a straight extension of the distributor flange or to form several angular positions with the plane of the flange 42 by merely bending the vane and securing it in the desired position by means of bolt 48. Since the vane 47 is merely deformed during adjustment a smooth and unobstructed face is presented by the flange 42 together with the vane extension 47. The purpose of the flange together with its deflecting vane is to control the included angle of distribution of the disintegrated straw product and to limit the direction and distance which the product is thrown. The vane is useful in compensating for wind which may tend to misdirect or otherwise interfere with the uniform distribution of the straw and stalk particles. The retarder pan 41 serves to retard the dropping of straw through the blades and the probability that any given straw or plant stalk segment will have a succession of cutting operations is thus enhanced. The more the straw is reduced the more easily it is removed from the cutting area since the mass of each particle is less. The operational efficiency is unusually great in my device because of the light weight of all the elements involved and the lack of frictional rubbing and shearing which is obviated by the freely falling straw particles. The retarder pan thus functions not to hold the straw particle while another element shears it but merely retains it in available position to be tossed about by air turbulence for probable successive cutting before discharge from the distributor element. The high speed of the cutter blades is such as to sever the straw and stalk particles while falling in mid-air or when one end thereof is lightly touching the retarder pan face. It has been found that for a cutter arm whose radial length is in the neighborhood of 2 feet 3 inches a speed ranging from 400 to 1200 R. P. M. may be usefully employed. The optimum range, however, lies from 800 to 1000 R. P. M. Increasing the speed increases the cutting action and slowing the speed conversely decreases the cutting action.

A guard 49 consisting of circularly bent rods and connecting braces is attached to the supporting structure so as to extend for a short distance beyond the circular path described by the tips of the cutter arms. The object of the guard is to prevent accidental contact with the rapidly rotating cutter blades either by humans or inanimate objects. The guard must necessarily be placed a short distance above the arms so as not to interfere with the tangential distribution of straw and stalk particles.

In the operation of the device as the combine or other harvester 1 is moving forwardly in the direction indicated by the arrow in Fig. 1 the straw and stalk material is simultaneously moved backward by air flow and by the conveyor 3 within the rear housing 2. The straw descends into the discharge passageway defined by walls 5 of the hood 2 and through the discharge opening at the bottom thereof. The elongated straws and stalks fall into the path of the rapidly rotating cutting blades 32 and 33 and some particles are simultaneously comminuted and thrown from the surrounding blades by centrifugal force and impact in a tangential direction. The greater portion of the particles, however, are cut successively by one or more of the cutting edges and are either cast tangentially against the distributor flange 42 or momentarily rest upon the retarder pan 41. These latter particles are again picked up by the turbulence of the air surrounding the cutter arms in motion and are again cut and thrown tangentially from the orbit of travel of the cutter arms. The greater concentration of tangential distribution occurs in the region of the flange 42 and the particles are thus made to rebound from the distributor flange and are guided past the deflecting vane 47 in a manner so as to be evenly distributed over the soil upon which the harvester 1 is traveling. The distributor flange 42 also serves to prevent cut straw and stalk products from being cast back toward the body of the harvester where such particles might otherwise be drawn into the grain cleaning operation of the harvester and contaminate the product.

My device which is the subject of this invention has been particularly successful in accomplishing its purpose because it is able to cut the stalk and straw material into much finer pieces than other devices which have been designed to accomplish the spreading of straw back onto the soil. In addition to this complete comminuting action, the cutter arms because of their high peripheral speed cause an extremely wide, even distribution of the particles laterally to the forward motion of the combine or other harvester. This wide distribution, together with the fine cutting action differentiates over other old devices built into the discharge passage of the combine and which, to a greater or lesser degree, tended to windrow the particles in concentrated fashion over the surface of the terrain. Where the particles of straw are elongated and are thus concentrated it becomes difficult to plow them back into the soil. Where, however, the particles are finely cut and evenly distributed by use of my invention, plowing is facilitated and the particles are much more quickly altered to humus which in turn enriches the soil.

It is to be understood that the exact structure and position of mounting thereof as shown in the drawings herewith may be deviated from while still remaining within the spirit of the invention. For example, the mounting structure may be placed somewhat to the left or right of the discharge opening and the axis of the shaft bearing the cutting arms may deviate somewhat from the vertical and still accomplish a useful and desirable cutting and distributing action.

What is claimed is:

1. A cutting and comminuting device for a harvester of the type which is adapted to move across the terrain and which has a housing including wall portions at the rear thereof defining a descending straw and stalk discharge passage, said device having in combination a mounting structure attached to a wall portion of said housing adjacent said discharge passage, a substantially vertical shaft journaled in the mounting structure, a plurality of cutter arms extending radially of and rotatable with said shaft, a cutting blade attached to and forming at least a portion of the leading edge of each of said arms, the effective path of the cutting blades sweeping beneath and substantially across the area of the discharge passage for effecting firstly a cutting and comminuting operation upon individual straws and stalks and secondly a distributing operation upon the particles formed therefrom, driving mechanism for connection to a power source associated with said harvester for rotating said shaft at a high speed, and retarding and distributing mechanism carried by said housing and disposed beneath and extending across said discharge passage, said last named mechanism comprising a combined upstanding distributor flange and deflecting vane element and a substantially horizontal retarder flange portion underlying a portion of the orbital path of the cutting blades, said distributor flange being disposed forwardly of and in working clearance to the outer ends of said cutter arms and said element being at a predetermined angle to said distributor flange.

2. A cutting and comminuting device according to claim 1 and additionally including cooperative means for adjustably fixing the angular relationship between the distributor flange and the deflecting vane element.

3. A cutting and comminuting device for a combine or other harvester having a housing including a rear and side walls defining a generally descending discharge passage for straw and plant stalks terminating in a substantially horizontal rectangular opening, said device comprising a mounting structure attached to said rear wall, a vertical shaft journaled in the mounting structure, a plurality of cutter arms extending radially of and rotated by said shaft at the lower end thereof, a cutting edge extending radially inwardly over an outer end portion of the leading edge of each of said arms, the effective path of the cutting edges sweeping substantially across the area of the discharge opening for effecting a cutting and comminuting operation upon the individual straws and stalks and also a distributing operation upon the particles formed therefrom, driving means for rotating said shaft at high speed, and a baffle structure carried by the lower end of said rear wall below said opening and above the cutter arms and having a deflecting surface extending substantially across said opening between said side walls and forwardly and downwardly into the normal path of discharge of the straws and stalks to a point adjacent the inner ends of the cutting edges of said arms to guide and control the feed of the straws and stalks away from the shaft and into the orbital sweep of the cutting edges.

4. A cutting and comminuting device for a combine or other harvester having a housing including a rear and side walls defining a generally descending discharge passage for straw and plant stalks terminating in a substantially horizontal rectangular opening, said device comprising a mounting structure attached to said rear wall, a vertical shaft journaled in the mounting structure, a plurality of cutter arms extending radially of and rotated by said shaft at the lower end thereof, a cutting edge extending radially inwardly over an outer end portion of the leading edge of each of said arms, the effective path of the cutting edges sweeping substantially across the area of the discharge opening for effecting a cutting and comminuting operation upon the individual straws and stalks and also a distributing operation upon the particles formed therefrom, driving means for rotating said shaft at high speed, and a baffle structure carried by the lower end of said rear wall below said opening and above the cutter arms and having a deflecting surface extending substantially across said opening between said side walls and forwardly and downwardly into the normal path of discharge of the straws and stalks to a point adjacent the inner ends of the cutting edges of said arms to guide and control the feed of the straws and stalks away from the shaft and into the orbital sweep of the cutting edges, and additional means having a substantial effective horizontal area disposed below said cutter arms in the path of the discharging straws and stalks having a retarding effect on the descent of the latter and bringing about more effective comminution of the straws and stalks.

References Cited in the file of this patent

UNITED STATES PATENTS

| | | |
|---|---|---|
| 1,625,353 | Dugan | Apr. 19, 1927 |
| 1,680,824 | Thompson | Aug. 14, 1928 |
| 1,886,140 | Welty | Nov. 1, 1932 |
| 2,280,677 | Wagner et al. | Apr. 21, 1942 |

FOREIGN PATENTS

| | | |
|---|---|---|
| 174,645 | Germany | Sept. 26, 1906 |